United States Patent
Ranjanghatmuralidhar et al.

(10) Patent No.: US 10,685,324 B2
(45) Date of Patent: Jun. 16, 2020

(54) METHOD AND SYSTEM FOR OPTIMIZING STORAGE AND RETRIEVAL OF A STOCK KEEPING UNIT (SKU)

(71) Applicant: HCL Technologies Limited, Noida (IN)

(72) Inventors: Madhusudhan Ranjanghatmuralidhar, Chennai (IN); Ashar Pasha, Dallas, TX (US)

(73) Assignee: HCL Technologies Limited, Nodia, Uttar Pradesh ( * ) Notice: Subject to any disclaimer, the term of this patent is extended or adjusted under 35 U.S.C. 154(b) by 209 days.

(21) Appl. No.: 15/983,025

(22) Filed: May 17, 2018

(65) Prior Publication Data

US 2018/0336514 A1    Nov. 22, 2018

(30) Foreign Application Priority Data

May 19, 2017 (IN) .............................. 201711017619

(51) Int. Cl.
 *G06Q 10/08* (2012.01)
 *G06K 19/06* (2006.01)
 *G06F 16/903* (2019.01)

(52) U.S. Cl.
 CPC ..... *G06Q 10/087* (2013.01); *G06F 16/90335* (2019.01); *G06K 19/06028* (2013.01)

(58) Field of Classification Search
 CPC ........... G06Q 10/087; G06Q 10/06316; G06Q 10/063114; G06Q 10/06312; G06K 7/10366; B65D 79/02
 See application file for complete search history.

(56) References Cited

U.S. PATENT DOCUMENTS

| | | | | |
|---|---|---|---|---|
| 6,341,269 B1* | 1/2002 | Dulaney | .............. | G06Q 10/087 705/22 |
| 6,744,436 B1* | 6/2004 | Chirieleison, Jr. | .. | G06Q 10/087 345/419 |
| 7,721,212 B2* | 5/2010 | Alfandary | ............ | G06Q 10/087 715/735 |
| 7,809,676 B2* | 10/2010 | Chorley | ................ | G06Q 10/06 707/600 |

(Continued)

OTHER PUBLICATIONS

DHL "Augmented Reality in Logistics", 2014.

*Primary Examiner* — Ashford S Hayles
(74) *Attorney, Agent, or Firm* — HM Law Group LLP; Vanintheran Moodley

(57) ABSTRACT

Disclosed is a Warehouse Management System (WMS) for optimizing storage and retrieval of a Stock Keeping Unit (SKU) present in a warehouse. A pallet identification module identifies one or more pallets capable for storing a plurality of SKUs. A notifying module notifies a first operator for storing the plurality of SKUs in the one or more pallets. A database update module updates an address of each pallet in a WMS database. A pickup list module provides a pickup list comprising one or more SKUs to be retrieve. A determination module determines at least one pallet and a second operator from the one or more pallets and a plurality of second operators respectively. An operator guiding module guides the second operator, via a virtual map displayed on the AR enabled device, to the address of the at least one pallet in order to retrieve the one or more SKUs.

12 Claims, 4 Drawing Sheets

(56) References Cited

U.S. PATENT DOCUMENTS

| | | | |
|---|---|---|---|
| 7,930,050 B2* | 4/2011 | Wertheimer | G06Q 10/04 700/99 |
| 8,358,903 B1* | 1/2013 | Meads | H04N 5/765 348/86 |
| 8,626,611 B2 | 1/2014 | Bravo | |
| 8,839,132 B2* | 9/2014 | Reichert | G06Q 10/087 345/419 |
| 8,918,750 B1 | 12/2014 | Moffitt | G06F 30/392 716/122 |
| 9,007,368 B2* | 4/2015 | Laffargue | G06T 17/20 345/419 |
| 9,488,986 B1* | 11/2016 | Solanki | G06K 9/00791 |
| 9,632,313 B1* | 4/2017 | Madan | G06F 3/011 |
| 9,792,577 B2* | 10/2017 | Mountz | G06Q 10/087 |
| 10,055,697 B2* | 8/2018 | M | G06Q 10/04 |
| 2003/0004925 A1* | 1/2003 | Knoblock | G06Q 10/06 |
| 2003/0149644 A1* | 8/2003 | Stingel, III | G06Q 10/08 705/28 |
| 2004/0183751 A1* | 9/2004 | Dempski | G02B 27/017 345/8 |
| 2009/0013268 A1* | 1/2009 | Amit | G06T 11/60 715/763 |
| 2009/0063035 A1* | 3/2009 | Mandel | G06Q 10/04 701/437 |
| 2009/0082902 A1* | 3/2009 | Foltz | G06Q 10/087 700/214 |
| 2009/0153587 A1* | 6/2009 | Kang | G06T 19/006 345/632 |
| 2009/0164041 A1* | 6/2009 | Geng | G06Q 10/08 700/215 |
| 2009/0182499 A1* | 7/2009 | Bravo | G01C 21/20 701/408 |
| 2010/0121480 A1* | 5/2010 | Stelzer | B65G 1/137 700/215 |
| 2010/0318403 A1* | 12/2010 | Bottom | G06Q 10/0637 705/7.36 |
| 2011/0295764 A1* | 12/2011 | Cook | G06Q 10/06 705/348 |
| 2012/0246027 A1 | 9/2012 | Martin | |
| 2013/0226649 A1* | 8/2013 | Grissom | G06Q 10/087 705/7.25 |
| 2014/0012612 A1* | 1/2014 | Abdic | G06Q 10/08 705/7.12 |
| 2014/0083058 A1* | 3/2014 | Issing | B65G 1/1378 53/473 |
| 2014/0149172 A1* | 5/2014 | Rogut | G06Q 10/06316 705/7.26 |
| 2014/0214600 A1* | 7/2014 | Argue | G06Q 30/0639 705/26.8 |
| 2014/0244392 A1* | 8/2014 | Chang | G06Q 10/087 705/14.58 |
| 2014/0324491 A1* | 10/2014 | Banks | G06Q 10/087 705/7.12 |
| 2015/0046299 A1* | 2/2015 | Yan | G06Q 10/087 705/28 |
| 2015/0170256 A1* | 6/2015 | Pettyjohn | G06Q 30/0639 705/14.49 |
| 2015/0192774 A1* | 7/2015 | Watanabe | B65G 1/1375 345/8 |
| 2015/0199627 A1* | 7/2015 | Gould | G06Q 10/0631 705/7.12 |
| 2015/0302650 A1* | 10/2015 | Abdelmoati | G06F 3/041 345/633 |
| 2015/0347854 A1* | 12/2015 | Bare | G06T 19/006 345/633 |
| 2016/0019717 A1* | 1/2016 | Yopp | G06Q 10/067 345/633 |
| 2016/0092831 A1* | 3/2016 | Qin | G06Q 10/08 705/28 |
| 2016/0125656 A1* | 5/2016 | James | G06T 7/60 345/633 |
| 2016/0247108 A1* | 8/2016 | Acuna | G06Q 10/06315 |
| 2017/0069135 A1* | 3/2017 | Komaki | H04N 5/2252 |
| 2017/0091704 A1* | 3/2017 | Wolf | G06Q 10/043 |
| 2017/0147967 A1* | 5/2017 | Behera | G06Q 10/087 |
| 2017/0200108 A1* | 7/2017 | Au | G06Q 10/06398 |
| 2017/0286901 A1* | 10/2017 | Skaff | G06N 3/0454 |
| 2017/0318422 A1* | 11/2017 | Kokkonen | H04W 4/023 |
| 2018/0005446 A1* | 1/2018 | Elazary | G06T 19/006 |
| 2018/0025310 A1* | 1/2018 | Gabbai | G06Q 10/04 705/28 |
| 2018/0053145 A1* | 2/2018 | Jones | G06Q 10/087 |
| 2018/0057264 A1* | 3/2018 | Wicks | B65G 1/1376 |
| 2018/0060765 A1* | 3/2018 | Hance | G06Q 10/043 |
| 2018/0088586 A1* | 3/2018 | Hance | G05D 1/0236 |
| 2018/0089616 A1* | 3/2018 | Jacobus | G05D 1/0246 |
| 2018/0089870 A1* | 3/2018 | Billi-Duran | G05B 23/0205 |
| 2018/0096265 A1* | 4/2018 | M | G06Q 10/04 |
| 2018/0101810 A1* | 4/2018 | Feng | G06Q 10/08 |
| 2018/0158016 A1* | 6/2018 | Pandya | G06Q 10/087 |
| 2018/0322444 A1* | 11/2018 | Todeschini | G02B 27/017 |
| 2018/0364719 A1* | 12/2018 | Wang | B65G 1/1371 |
| 2019/0266552 A1* | 8/2019 | Gupta | B65G 1/1373 |
| 2019/0279426 A1* | 9/2019 | Musunuri | G06Q 10/08 |
| 2019/0294841 A1* | 9/2019 | Hall | G06Q 50/28 |

* cited by examiner

METHOD AND SYSTEM FOR OPTIMIZING STORAGE AND RETRIEVAL OF A STOCK KEEPING UNIT (SKU)

CROSS REFERENCE TO RELATED APPLICATIONS

The present application claims priority from Indian Patent Application No. 201711017619 filed on 19 May 2017 the entirety of which is hereby incorporated by reference.

TECHNICAL FIELD

The present subject matter described herein, in general, relates to optimize storage and retrieval of a Stock Keeping Unit (SKU) present in a warehouse. More specifically, an Augmented Reality (AR) based Warehouse Management System (WMS) for optimizing storage and retrieval of the SKU from the warehouse.

BACKGROUND

It is becoming difficult for warehouse managers to keep a track on Stock Keeping Units (SKUs) location and available space, as warehouses have expanded by square miles. Due to the absence of Information Technology (IT), the warehouse managers face difficulty relying solely on their own memory especially in the high volume of stock in modern warehouses. As a result, some of them have used the traditional method of remembering the location by noting on the paper. However, the excessive amounts of paperwork produced by inventory data may sometimes confuse operators, even though they are necessary for the management of warehousing. With the emergence of Information Technology in the last two decades, Computerized Warehouse Management Systems (WMS) have been implemented across the industry. However, the Computerized WMS presently do not provide any other way of visualizing a warehouse besides using naming methods based on stock location systems.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for optimizing storage and retrieval of a Stock Keeping Unit (SKU) present in a warehouse and the concepts are further described below in the detailed description. This summary is not intended to identify essential features of the claimed subject matter nor is it intended for use in limiting the scope of the claimed subject matter.

In one implementation, a Warehouse Management System (WMS) for optimizing storage and retrieval of a Stock Keeping Unit (SKU) present in a warehouse is disclosed. The system may comprise a processor and a memory coupled to the processor. The processor may execute a plurality of modules present in the memory. The plurality of modules may comprise a pallet identification module, a notifying module, a database update module, a pickup list module, a determination module, and an operator guiding module. The pallet identification module may identify one or more pallets, present in a warehouse, capable for storing a plurality of SKUs. In one aspect, the one or more pallets may be identified based on a first metadata and a second metadata associated to the one or more pallets and the plurality of SKUs respectively. The notifying module may notify a first operator via an Augmented Reality (AR) enabled device, belongs to the first operator, for storing the plurality of SKUs in the one or more pallets. The database update module may update an address of each pallet, storing the plurality of SKUs, in a Warehouse Management System (WMS) database upon receiving a signal from the first operator via the AR enabled device. In one aspect, the signal may indicate occupancy of the plurality of SKUs in the one or more pallets. The pickup list module may provide a pickup list comprising one or more SKUs, to be retrieve, stored in the one or more pallets. The determination module may determine at least one pallet, of the one or more pallets, storing the one or more SKUs. The at least one pallet may be determined based on the address stored in the WMS database. The determination module may further determine a second operator, amongst a plurality of second operators, closest to the at least one pallet. The operator guiding module may guide the second operator, via a virtual map displayed on the AR enabled device, to the address of the at least one pallet in order to retrieve the one or more SKUs thereby optimizing storage and retrieval of the SKU present in the warehouse.

In another implementation, a method for optimizing storage and retrieval of a Stock Keeping Unit (SKU) present in a warehouse is disclosed. In order to optimize the storage and the retrieval of the SKU, initially, one or more pallets, present in a warehouse, capable for storing a plurality of SKUs may be identified. In one aspect, the one or more pallets may be identified based on a first metadata and a second metadata associated to the one or more pallets and the plurality of SKUs respectively. Upon identification of the one or more pallets, a first operator may be notified via an Augmented Reality (AR) enabled device, belongs to the first operator, for storing the plurality of SKUs in the one or more pallets. Subsequently an address of each pallet, storing the plurality of SKUs, may be updated in a Warehouse Management System (WMS) database upon receiving a signal from the first operator via the AR enabled device. In one aspect, the signal may indicate occupancy of the plurality of SKUs in the one or more pallets. Upon updating the WMS database, a pickup list comprising one or more SKUs, to be retrieve, may be provided. Post receipt of the pickup list, at least one pallet and a second operator may be determined from the one or more pallets and a plurality of second operators respectively. In one aspect, the at least one pallet may be determined based on the address stored in the WMS database. In one aspect, an operator amongst the plurality of second operators closest to the at least one pallet may be determined as the second operator. Once the at least one pallet and the second operator are determined, the second operator may be guided, via a virtual map displayed on the AR enabled device, to the address of the at least one pallet in order to retrieve the one or more SKUs thereby optimizing storage and retrieval of the SKU in the warehouse. In one aspect, the aforementioned method for optimizing the storage and the retrieval of the SKU may be performed by a processor using programmed instructions stored in a memory.

In yet another implementation, non-transitory computer readable medium embodying a program executable in a computing device for optimizing storage and retrieval of a Stock Keeping Unit (SKU) present in a warehouse is disclosed. The program may comprise a program code for identifying one or more pallets, present in a warehouse, capable for storing a plurality of SKUs, wherein the one or more pallets are identified based on a first metadata and a second metadata associated to the one or more pallets and the plurality of SKUs respectively. The program may further comprise a program code for notifying a first operator via an Augmented Reality (AR) enabled device, belongs to the first operator, for storing the plurality of SKUs in the one or more pallets. The program may further comprise a program code for updating an address of each pallet, storing the plurality of SKUs, in a Warehouse Management System (WMS) database upon receiving a signal from the first operator via the AR enabled device, wherein the signal indicates occupancy of the plurality of SKUs in the one or more pallets. The program may further comprise a program code for providing a pickup list comprising one or more SKUs, to be retrieve, stored in the one or more pallets. The program may further comprise a program code for determining at least one pallet, of the one or more pallets, storing the one or more SKUs, wherein the at least one pallet is determined based on the address stored in the WMS database. The program may further comprise a program code for determining a second operator, amongst a plurality of second operators, closest to the at least one pallet. The program may further comprise a program code for guiding the second operator, via a virtual map displayed on the AR enabled device, to the address of the at least one pallet in order to retrieve the one or more SKUs thereby optimizing storage and retrieval of the SKU present in the warehouse.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
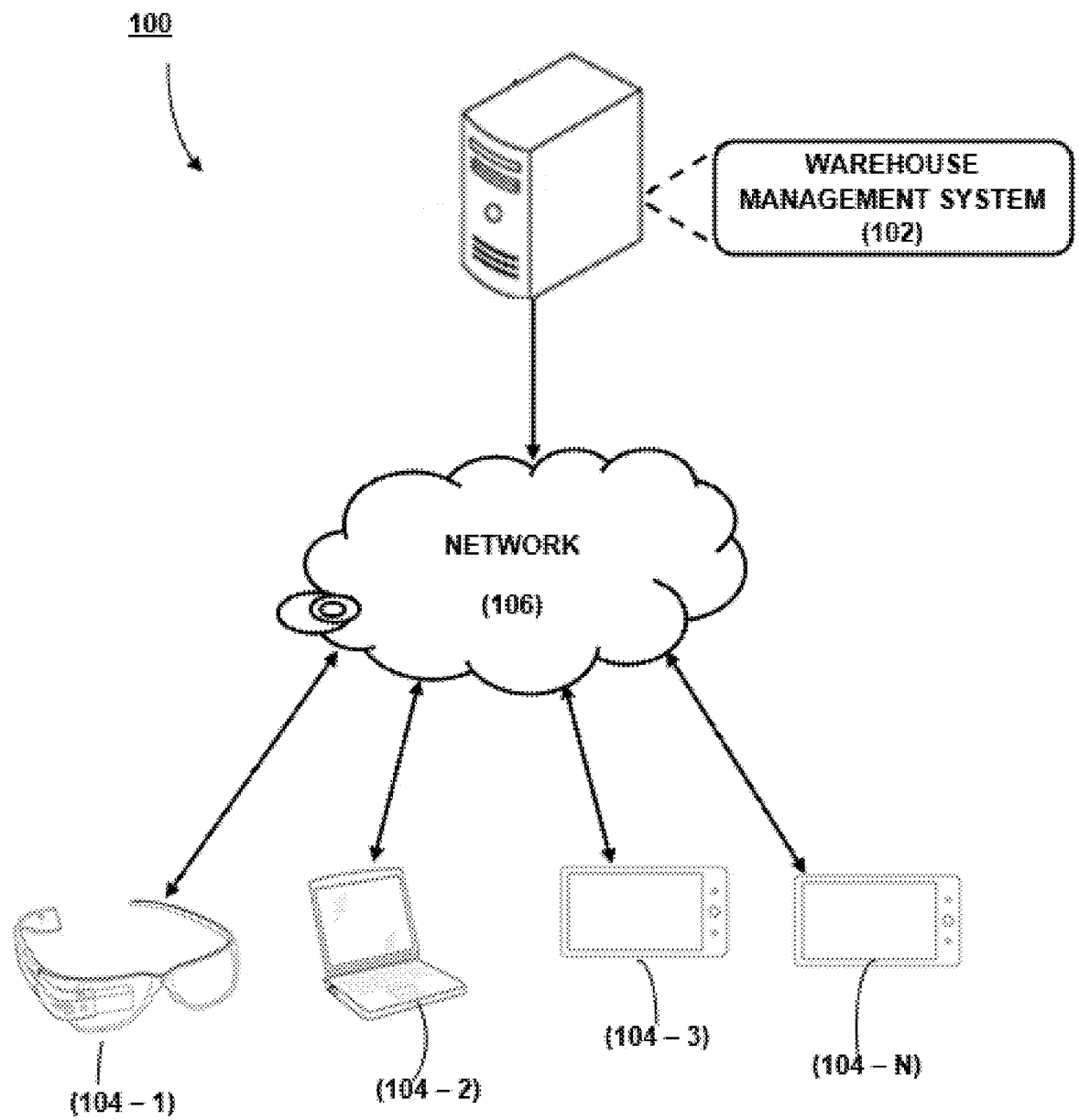
FIG. 1 illustrates a network implementation of a Warehouse Management System (WMS) for optimizing storage and retrieval of a Stock Keeping Unit (SKU) present in a warehouse, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The proposed Warehouse Management System (WMS) facilitates to optimize storage and retrieval of a Stock Keeping Unit (SKU) present in a warehouse is disclosed. It may be understood that the storage and retrieval of the SKU may be optimized by implementation of Augmented Reality (AR) in the WMS. The primary objective of implementing the AR in the WMS is to enable logistics service providers and their customers involved in freight management to gain visibility of each and every event across the shipments lifecycle within their multiple systems globally. It may be understood that the AR may be implemented in a number of areas in order to optimize storage and retrieval of the SKU in the WMS. It may guide an operator working in the warehouse through the shortest route to store, locate and pick the correct SKU in the warehouse which significant leads to efficiency gains.

In order to store the SKU in appropriate place in the warehouse, one or more pallets, present in the warehouse, capable for storing a plurality of SKUs may be identified. Upon identification of the one or more pallets, a fork operator responsible for storing the plurality of SKUs in the one or more pallets, may be notified on an Augmented Reality (AR) enabled device belongs to the fork operator. The notification indicates the fork operator to store the plurality of SKUs in the one or more pallets. Examples of the AR enabled device may include, but not limited to, Head Unit Display (HUD), a Google™ Glass, Contact lenses, Virtual retinal display, and Handheld device. Subsequently, an address of each pallet, storing the plurality of SKUs, may be updated in a Warehouse Management System (WMS) database upon receiving a signal from the fork operator via the AR enabled device.

After storing the plurality of SKUs, when an operator working the warehouse needs to retrieve one or more SKUs from the warehouse, the operator determines at least one pallet upon referring to the WMS database. In an exemplary embodiment of the invention, the operator may be guided, by the WMS via a virtual map displayed on the AR enabled device, to the address of the at least one pallet in order to swiftly retrieve the one or more SKUs. Thus, in this manner, the proposed WMS optimizes the storage and the retrieval of the SKU present in the warehouse.

In addition to the above, implementation of the AR in the WMS may further facilitate to establish communication with IoT devices and multiple systems like Track Management System (TMS), Freight Management Systems (FMS), and Warehouse Management System (WMS) so as to provide real-time visibility to various stakeholders in Supply Chain Management (SCM). While aspects of described system and method for optimizing storage and retrieval of the SKU present in the warehouse and may be implemented in any number of different computing systems, environments, and/or configurations, the embodiments are described in the context of the following exemplary WMS.

Referring now to FIG. 1, a network implementation 100 of a Warehouse Management System (WMS) 102 for optimizing storage and retrieval of a Stock Keeping Unit (SKU) present in a warehouse is disclosed. In order to optimize the storage and the retrieval of the SKU, initially, the WMS 102 identifies one or more pallets, present in a warehouse, capable for storing a plurality of SKUs. Upon identification of the one or more pallets, the WMS 102 notifies a first operator may be notified via an Augmented Reality (AR) enabled device, belongs to the first operator, for storing the plurality of SKUs in the one or more pallets. Subsequently, the WMS 102 updates an address of each pallet, storing the plurality of SKUs, in a WMS database upon receiving a signal from the first operator via the AR enabled device. Upon updating the WMS database, the WMS 102 provides a pickup list comprising one or more SKUs to be retrieve. Post receipt of the pickup list, the WMS 102 determines at least one pallet and a second operator from the one or more pallets and a plurality of second operators respectively. Once the at least one pallet and the second operator are determined, the WMS 102 guides the second operator, via a virtual map displayed on the AR enabled device, to the address of the at least one pallet in order to retrieve the one or more SKUs thereby optimizing storage and retrieval of the SKU in the warehouse.

Although the present disclosure is explained considering that the WMS 102 is implemented on a server, it may be understood that the WMS 102 may be implemented in a variety of computing systems, such as a laptop computer, a desktop computer, a notebook, a workstation, a mainframe computer, a server, a network server, a cloud-based computing environment. It will be understood that the WMS 102 may be accessed by multiple users through one or more user devices 104-1, 104-2 . . . 104-N, collectively referred to as user 104 or stakeholders, hereinafter, or applications residing on the user devices 104. In one implementation, the WMS 102 may comprise the cloud-based computing environment in which a user may operate individual computing systems configured to execute remotely located applications. In one aspect, the one or more user devices are Augmented Reality (AR) enabled devices. Examples of the AR enabled devices 104 may include, but are not limited to, a Head Unit Display (HUD), a Google™ Glass, Contact lenses, Virtual retinal display, and Handheld device. The AR enabled devices 104 are communicatively coupled to the WMS 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
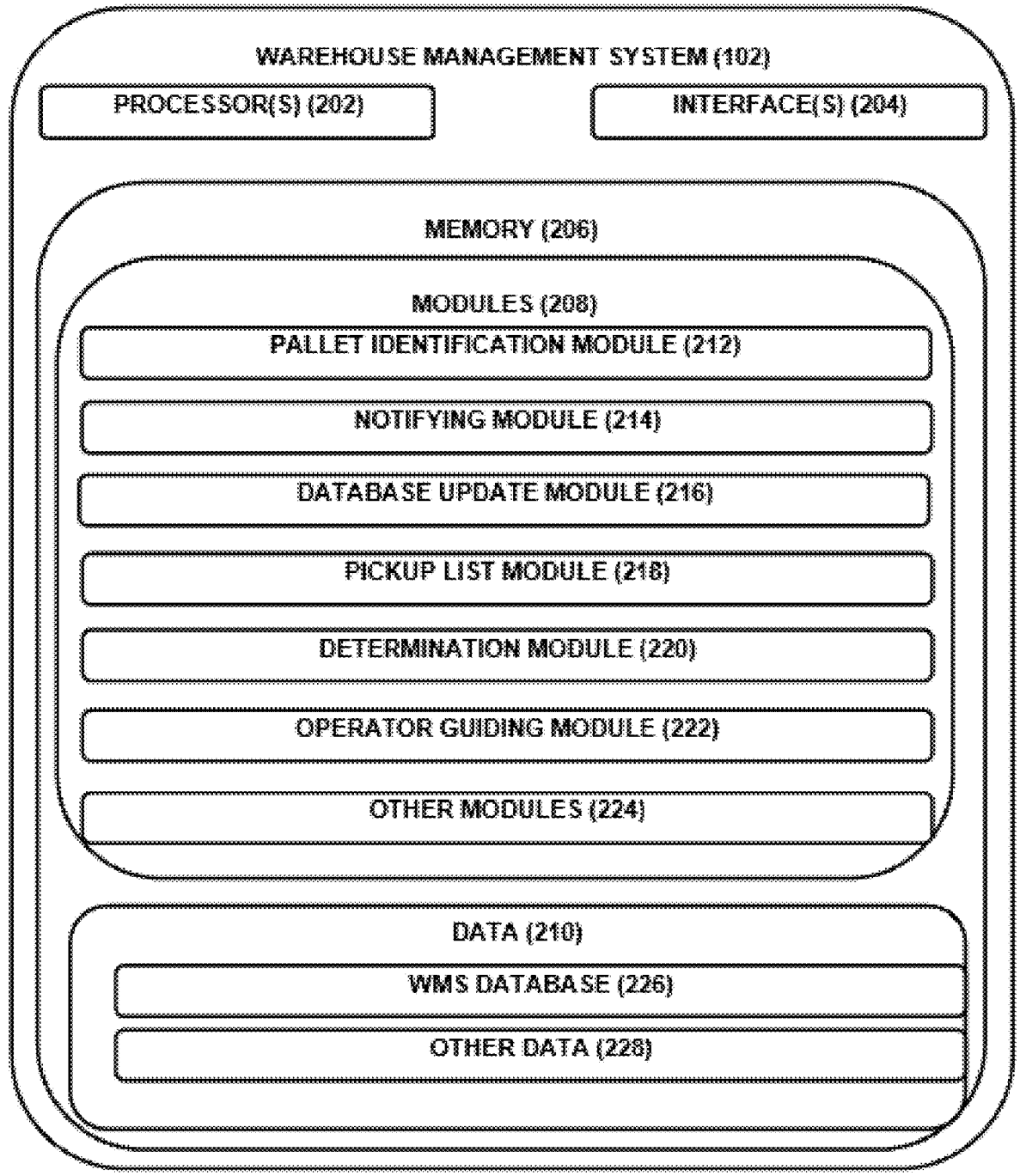
FIG. 2 illustrates the WMS, in accordance with an embodiment of the present subject matter.

Referring now to FIG. 2, the WMS 102 is illustrated in accordance with an embodiment of the present subject matter. In one embodiment, the WMS 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the WMS 102 to interact with the user directly or through the client devices 104. Further, the I/O interface 204 may enable the WMS 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a pallet identification module 212, a notifying module 214, a database update module 216, a pickup list module 218, a determination module 220, an operator guiding module 222, and other modules 224. The other modules 224 may include programs or coded instructions that supplement applications and functions of the WMS 102. The modules 208 described herein may be implemented as software modules that may be executed in the cloud-based computing environment of the WMS 102.

The data 210, amongst other things, serves as a repository for storing data processed, received, and generated by one or more of the modules 208. The data 210 may also include a WMS database 226, and other data 228. The other data 228 may include data generated as a result of the execution of one or more modules in the other modules 224.

As there are various challenges observed in the existing art, the challenges necessitate the need to build the WMS 102 for optimizing storage and retrieval of a Stock Keeping Unit (SKU) present in a warehouse. It may be understood that an operator (hereinafter also interchangeably referred to as a user or a first user) working in the warehouse may be facilitated with an Augmented Reality (AR) enabled device 104 communicatively coupled with the WMS 102. The AR enabled device 104 assists the operator to optimize the storage and retrieval of the SKU. In order to optimize the storage and retrieval of the SKU, at first, a user may use the client device 104 to access the WMS 102 via the I/O interface 204. The user may register them using the I/O interface 204 to use the WMS 102. In one aspect, the user may access the I/O interface 204 of the WMS 102. The WMS 102 may employ the pallet identification module 212, the notifying module 214, the database update module 216, the pickup list module 218, the determination module 220, and the operator guiding module 222. The detail functioning of the modules is described below with the help of figures.

The pallet identification module 212 identifies one or more pallets present in the warehouse. It may be understood that the one or more pallets are capable for storing a plurality of SKUs. In one aspect, the one or more pallets may be identified based on a first metadata and a second metadata associated to the one or more pallets and the plurality of SKUs respectively. The first metadata indicates dimensional data pertaining to the at least one pallet. The second metadata, on the other hand, indicates dimensional data pertaining to the SKU to be stored inside the one or more pallets. It may be understood that the dimensional data comprises at least one of a length, a depth, a breadth, and a height pertaining to a SKU as well as a pallet.

Thus, in order to identify the one or more pallet in the warehouse, the pallet identification module 212 checks the dimensional data of the SKU to be stored and accordingly identifies the pallet, in the warehouse, that may fit in the SKU in the pallet. In one embodiment, the first metadata pertaining to each pallet, present in the warehouse, may be pre-stored in the WMS database 226. The second metadata, on the other hand, may be determined based on a Radio Frequency Identification (RFID) tag associated to each SKU to be stored in the warehouse.

Figure 3:
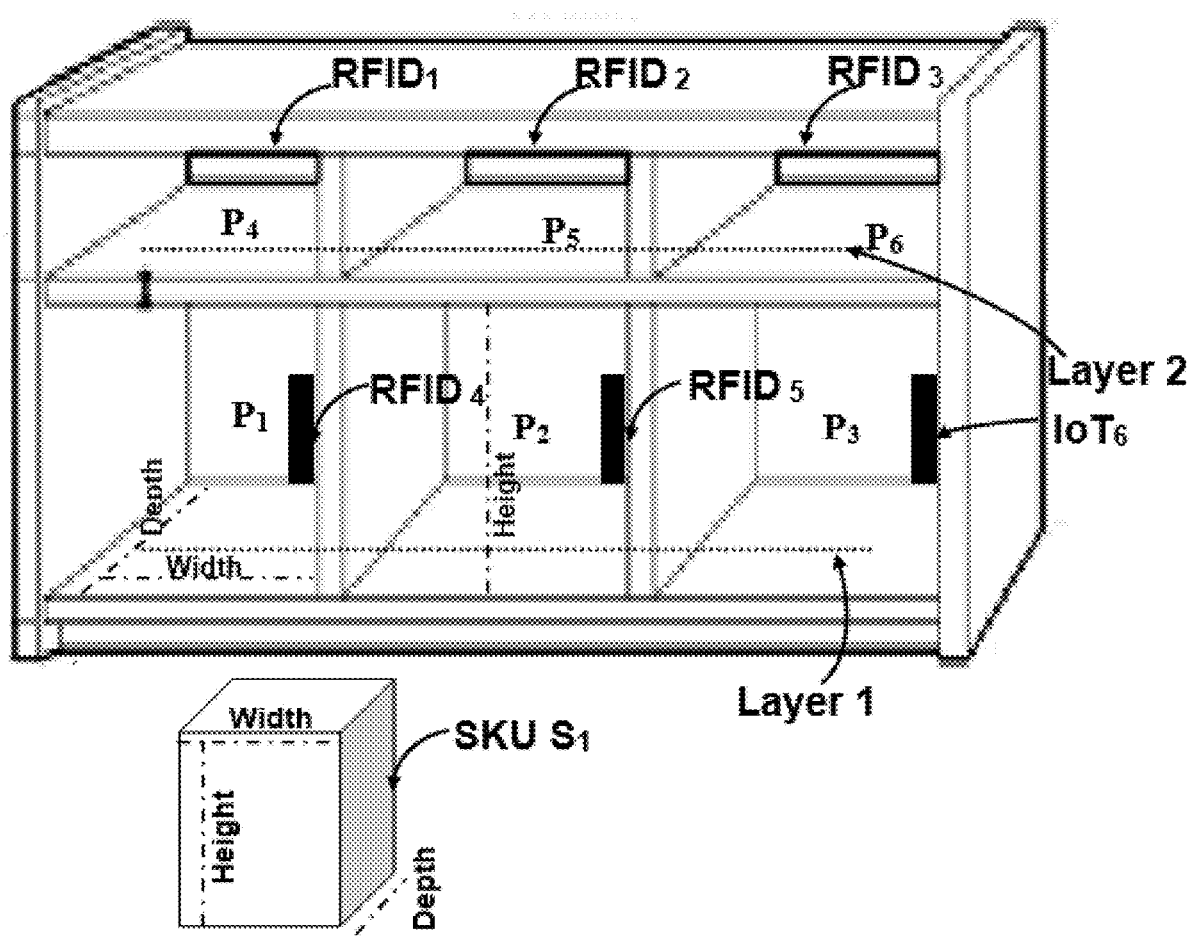
FIG. 3 illustrates an example of pallet storing an SKU, in accordance with an embodiment of the present subject matter.

In order to elucidate the above, consider an example, where a SKU $S_1$ is to be stored in at least one of Pallet $P_1$, $P_2$, $P_3$, ..., $P_6$ as shown in the FIG. 3. It may be understood that, as per the dimensions of the SKU $S_1$, the SKU $S_1$ can be fit in one of $P_1$, $P_2$, P3. Based on determination of the first metadata and second metadata, the pallet identification module 212 determines that the SKU $S_1$ does not fit in $P_4$, $P_5$, and $P_6$. Thus, the pallet identification module 212 identifies $P_1$, $P_2$, and, $P_3$ for storing the SKU $S_1$ as anyone of $P_1$, $P_2$, and, $P_3$ may accommodate SKU $S_1$ of given dimensions. Thus, in this manner, the pallet identification module 212 identifies the one or more pallets for storing a plurality of SKUs.

Subsequent to the identification of the one or more pallets, the notifying module 214 notifies a first operator, via an Augmented Reality (AR) enabled device 104 belongs to the first operator, for storing the plurality of SKUs in the one or more pallets. Examples, of the AR enabled device 104 may include, but not limited to, Head Unit Display (HUD), a Google™ Glass, Contact lenses, Virtual retinal display, and Handheld device. Based on the identification of the one or more pallets and thereby receipt of the notification, the first operator picks the plurality of SKUs and move towards the one or more pallets. In one embodiment, the WMS may guide the first operator, within the warehouse, to an address pertaining to each pallet for storing the plurality of SKUs. In one aspect, the first operator may be guided via the virtual map being displayed on the AR enabled device 104. By navigating the first operator through the virtual map, the first operator may reach at the address of the one or more pallets and thereby store each SKU in the one or more pallets, as identified, accordingly.

After storing the plurality of SKUs, the database update module 216 updates the address of each pallet, storing the plurality of SKUs, in the WMS database 226. In one embodiment, the WMS database 226 may be updated upon receiving a signal from the first operator triggered via the AR enabled device 104. In one aspect, the signal indicates occupancy of the plurality of SKUs in the one or more pallets. It may be understood that when the WMS database 226 is updated, none of the one or more pallets should have been identified by the pallet identification module 212, for storing another SKU, as said pallets have been occupied with at least one SKU of the plurality of SKUs.

Referring to the example same as aforementioned. Consider that the pallets are located at varying location within the warehouse. $P_1$ is located at $(X_1, Y_1)$ coordinates. Similarly, $P_2$ and $P_3$ are located at $(X_2, Y_2)$ and $(X_3, Y_3)$ coordinates respectively within the warehouse. In order to store SKU $S_1$ in $P_3$ as identified by the pallet identification module 212, the notifying module 214 notifies the first operator for storing the SKU $S_1$ in $P_3$. It is to be noted that the first operator is further guided using the virtual map to $(X_3, Y_3)$ coordinates, where $P_3$ is located in the warehouse. So that the first operator may easily locate and store the SKU $S_1$. Upon storing the SKU $S_1$ in $P_3$, the database update module 216 updates the address of pallet $P_3$ in the WMS database 226.

In one embodiment, the WMS database 226 further facilitate a second operator (hereinafter also referred to as a pickup operator) to swiftly pick up one or more SKUs from the one or more pallets. This is because the WMS database 226 accurately provides the address of the one or more pallets to the pickup operator, on the AR enabled device 104 belongs to the pickup operator, to pick up the one or more SKUs.

In order to do so, the pickup list module 218 provides a pickup list to the pickup operator. The pickup list comprises one or more SKUs, to be retrieve, stored in the one or more pallets. Upon providing the pickup list, the determination module 220 determines at least one pallet, of the one or more pallets, storing the one or more SKUs. The at least one pallet may be determined based on the address stored in the WMS database 226. In addition to the above, the determination module 220 further determines the pickup operator, amongst a plurality of second operators, closest to the at least one pallet. The closest pickup operator is identified to optimize retrieval process of the one or more SKUs.

In one embodiment, the determination module 220 determines the pickup operator closest to the at least one pallet by computing a distance for each pickup operator, present in the warehouse, from the at least one pallet. The distance may be computed based on the latitude-longitude coordinates of each pickup operator and the at least one pallet. Subsequently the determination module 220 compares the distance computed for each pickup operator in order to determine the closest pickup operator, amongst the plurality of second operators, to the at least one pallet.

Upon determination of the closest pickup operator, the operator guiding module 222 guides the pickup operator, via the virtual map displayed on the AR enabled device 104, to the address of the at least one pallet in order to retrieve the one or more SKUs. Subsequently, the operator guiding module 222 ensures the retrieval of the one or more SKUs as per the pickup list. In one aspect, the operator guiding module 222 ensures by scanning a barcode corresponding to each SKU, to be retrieved, by a scanning unit. Upon scanning the barcode, the operator guiding module 222 further retrieves details for each SKU. Subsequently, the operator guiding module 222 compares the details with a pre-stored details in order to ensure the retrieval of the one or more SKUs as per the pickup list. In one aspect, the comparison of the details may be facilitated by the AR enabled device 104.

Further referring to the example same as aforementioned. Consider a scenario where a pickup list is assigned to a pickup operator for retrieving the SKUs. The pickup list module 218 provides the pickup list on an AR enabled device 104 belongs to the pickup operator. It is to be noted that the pickup list comprises SKU $S_1$. In order to retrieve SKU $S_1$, the determination module 220 refers to the WMS database 226 and thereby determines that pallet $P_3$ is currently storing the SKU $S_1$. Since the pallet $P_3$ is located at $(X_3, Y_3)$ coordinates, the determination module 220 determines pickup operator closest to $(X_3, Y_3)$ coordinates amongst the plurality of operators. It is to be noted that the pickup operator $PUO_1$ is closest to the $(X_3, Y_3)$ coordinates at the time of providing the pickup list, $PUO_1$ is notified on the AR enabled device 104 to retrieve SKU $S_1$ from the pallet $P_3$. In addition to the above, the operator guiding module 222 guides $PUO_1$, via the virtual map displayed on the AR enabled device 104, to the $(X_3, Y_3)$ coordinates in order to retrieve SKU $S_1$. Thus, based on the aforementioned methodology, storage and retrieval of the SKU present in a warehouse may be optimized.

Figure 4:
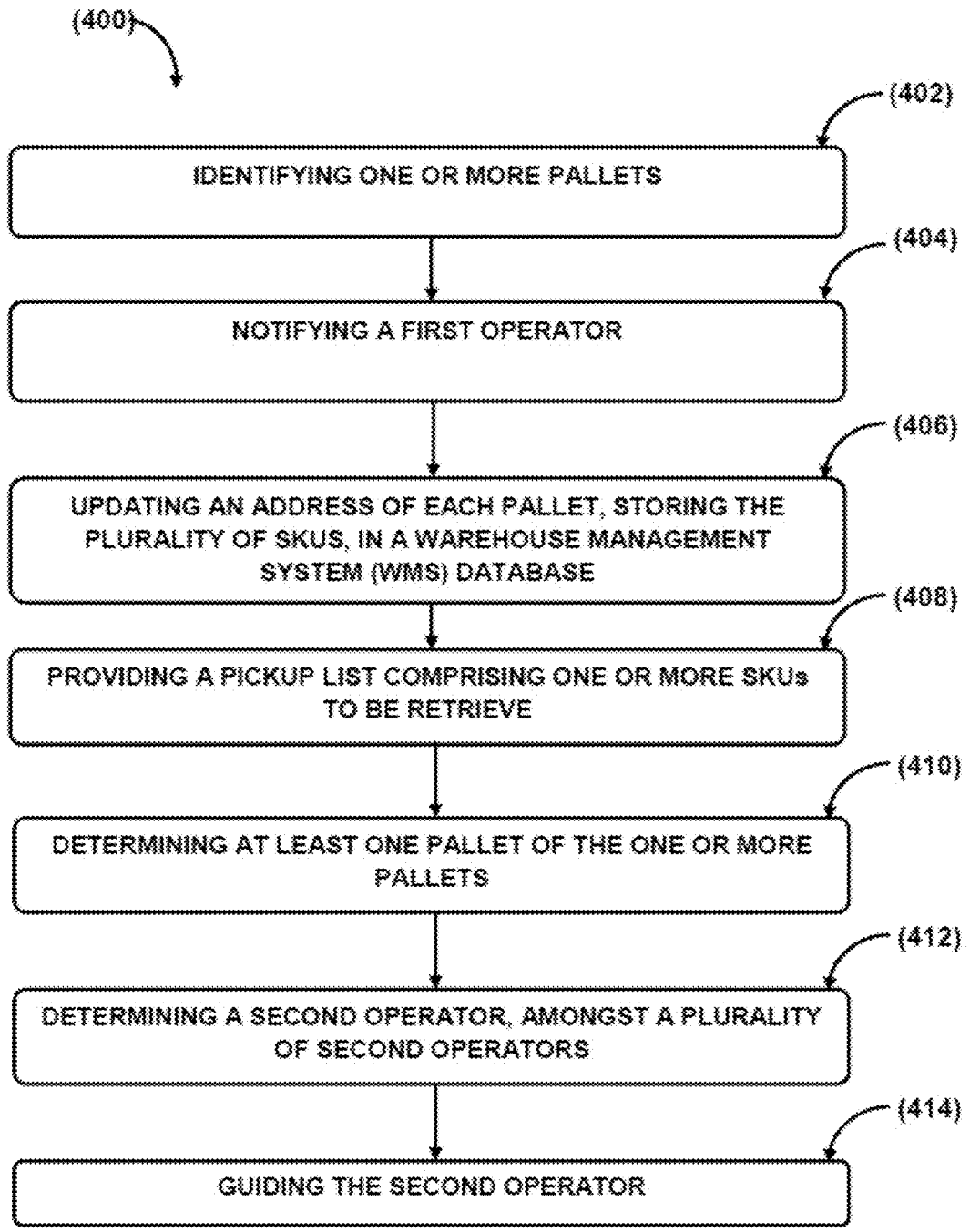
FIG. 4 illustrates a method for optimizing the storage and retrieval of the SKU present in the warehouse, in accordance with an embodiment of the present subject matter.

Referring now to FIG. 4, a method 400 for optimizing storage and retrieval of a Stock Keeping Unit (SKU) present in a warehouse is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the WMS 102.

At block 402, one or more pallets, present in a warehouse, capable for storing a plurality of SKUs may be identified. In one aspect, the one or more pallets may be identified based on a first metadata and a second metadata associated to the one or more pallets and the plurality of SKUs respectively. In one implementation, the one or more pallets may be identified by the pallet identification module 212.

At block 404, a first operator may be notified via an Augmented Reality (AR) enabled device 104, belongs to the first operator, for storing the plurality of SKUs in the one or more pallets. In one implementation, the first operator may be notified by the notifying module 214.

At block 406, an address of each pallet, storing the plurality of SKUs, may be updated in a Warehouse Management System (WMS) database 226 upon receiving a signal from the first operator via the AR enabled device 104. In one aspect, the signal may indicate occupancy of the plurality of SKUs in the one or more pallets. In one implementation, the address of each pallet may be updated by the database update module 216.

At block 408, a pickup list comprising one or more SKUs, to be retrieve, stored in the one or more pallets may be provided. In one implementation, the pickup list may be provided by the pickup list module 218.

At block 410, at least one pallet, of the one or more pallets, storing the one or more SKUs may be determined. In one aspect, the at least one pallet may be determined based on the address stored in the WMS database 226. In one implementation, the at least one pallet may be determined by the determination module 220.

At block 412, a second operator, amongst a plurality of second operators, closest to the at least one pallet may be determined. In one implementation, the second operator may be determined by the determination module 220.

At block 414, the second operator may be guided, via a virtual map being displayed on the AR enabled device 104, to the address of the at least one pallet in order to retrieve the one or more SKUs. In one implementation, the second operator may be guided by the operator guiding module 222.

Exemplary embodiments discussed above may provide certain advantages. Though not required to practice aspects of the disclosure, these advantages may include those provided by the following features.

Some embodiments enable a system and a method to verify correct product to be picked up by using optical readers, and instructs an operator to the next most logical item to be picked.

Some embodiments enable a system and a method to assist the operator in picking up the product swiftly and work more efficiently with greater accuracy.

With the implementation of Augmented Reality (AR) in warehouse, the operator can keep his/her hands free to pick items as the list is displayed within the visual field of AR enabled device.

Although implementations for methods and systems for optimizing storage and retrieval of a Stock Keeping Unit (SKU) present in a warehouse have been described in language specific to structural features and/or methods, it is to be understood that the appended claims are not necessarily limited to the specific features or methods described. Rather, the specific features and methods are disclosed as examples of implementations for optimizing the storage and retrieval of the SKU present in the warehouse.

The invention claimed is:

1. A method for optimizing storage and retrieval of a Stock Keeping Unit (SKU) present in a warehouse, the method comprising:

identifying, by a processor, one or more pallets, present in a warehouse, capable for storing a plurality of SKUs, wherein the one or more pallets are identified based on a first metadata and a second metadata associated to the one or more pallets and the plurality of SKUs respectively;

notifying, by the processor, a first operator via an Augmented Reality (AR) enabled device, belongs to the first operator, for storing the plurality of SKUs in the one or more pallets;

updating, by the processor, an address of each pallet, storing the plurality of SKUs, in a Warehouse Management System (WMS) database upon receiving a signal from the first operator via the AR enabled device, wherein the signal indicates occupancy of the plurality of SKUs in the one or more pallets;
providing, by the processor, a pickup list comprising one or more SKUs, to be retrieve, stored in the one or more pallets;
determining, by the processor,
at least one pallet, of the one or more pallets, storing the one or more SKUs, wherein the at least one pallet is determined based on the address stored in the WMS database, and
a second operator, amongst a plurality of second operators, closest to the at least one pallet; and
guiding, by the processor, the second operator, via a virtual map being displayed on the AR enabled device, to the address of the at least one pallet in order to retrieve the one or more SKUs thereby optimizing storage and retrieval of the SKU present in the warehouse.

2. The method of claim 1, wherein the first metadata indicates dimensional data pertaining to the at least one pallet, and wherein the second metadata indicates dimensional data pertaining to the SKU to be stored inside the one or more pallets.

3. The method of claim 1 further comprising guiding the first operator to each pallet in order to store the plurality of SKUs, wherein the first operator is guided via the virtual map being displayed on the AR enabled device belongs to the first operator.

4. The method of claim 1, wherein the address of the at least one pallet is displayed in the AR enabled device.

5. The method of claim 1, wherein the second operator is determined by,
computing a distance for each second operator, present in the warehouse, from the at least one pallet, wherein the distance is computed based on the latitude-longitude coordinates of each second operator and the at least one pallet;
comparing the distance computed for each second operator; and
determining the second operator, amongst the plurality of second operators, closest to the at least one pallet based on the comparison.

6. The method of claim 1 further comprising ensuring the retrieval of the one or more SKUs as per the pickup list by,
scanning a barcode corresponding to each SKU, to be retrieved, by a scanning unit;
retrieving, upon scanning the barcode, details for each SKU; and
comparing the details with a pre-stored details in order to ensure the retrieval of the one or more SKUs as per the pickup list, wherein the comparison of the details with the pre-stored details is facilitated by the AR enabled device.

7. A Warehouse Management System (WMS) for optimizing storage and retrieval of a Stock Keeping Unit (SKU) present in a warehouse, the WMS comprising:
a processor; and
a memory coupled to the processor, wherein the processor is capable of executing a plurality of modules stored in the memory, and wherein the plurality of modules comprising:
a pallet identification module for identifying one or more pallets, present in a warehouse, capable for storing a plurality of SKUs, wherein the one or more pallets are identified based on a first metadata and a second metadata associated to the one or more pallets and the plurality of SKUs respectively;
a notifying module for notifying a first operator via an Augmented Reality (AR) enabled device, belongs to the first operator, for storing the plurality of SKUs in the one or more pallets;
a database update module for updating an address of each pallet, storing the plurality of SKUs, in a Warehouse Management System (WMS) database upon receiving a signal from the first operator via the AR enabled device, wherein the signal indicates occupancy of the plurality of SKUs in the one or more pallets;
a pickup list module for provide a pickup list comprising one or more SKUs, to be retrieve, stored in the one or more pallets;
a determination module for determining
at least one pallet, of the one or more pallets, storing the one or more SKUs, wherein the at least one pallet is determined based on the address stored in the WMS database, and
a second operator, amongst a plurality of second operators, closest to the at least one pallet; and
an operator guiding module for guiding the second operator, via a virtual map being displayed on the AR enabled device, to the address of the at least one pallet in order to retrieve the one or more SKUs thereby optimizing storage and retrieval of the SKU present in the warehouse.

8. The WMS of claim 7, wherein the first metadata indicates dimensional data pertaining to the at least one pallet, and wherein the second metadata indicates dimensional data pertaining to the SKU to be stored inside the one or more pallets.

9. The WMS of claim 7 further comprising guiding the first operator to each pallet in order to store the plurality of SKUs, wherein the first operator is guided via the virtual map being displayed on the AR enabled device belongs to the first operator.

10. The WMS of claim 7, wherein the determination module determines the second operator by,
computing a distance for each second operator, present in the warehouse, from the at least one pallet, wherein the distance is computed based on the latitude-longitude coordinates of each second operator and the at least one pallet;
comparing the distance computed for each second operator; and
determining the second operator, amongst the plurality of second operators, closest to the at least one pallet based on the comparison.

11. The WMS of claim 7, wherein the operator guiding module ensures the retrieval of the one or more SKUs as per the pickup list by,
scanning a barcode corresponding to each SKU, to be retrieved, by a scanning unit;
retrieving, upon scanning the barcode, details for each SKU; and
comparing the details with a pre-stored details in order to ensure the retrieval of the one or more SKUs as per the pickup list, wherein the comparison of the details with the pre-stored details is facilitated by the AR enabled device.

12. A non-transitory computer readable medium embodying a program executable in a computing device for optimizing storage and retrieval of a Stock Keeping Unit (SKU) present in a warehouse, the program comprising a program code:

a program code for identifying one or more pallets, present in a warehouse, capable for storing a plurality of SKUs, wherein the one or more pallets are identified based on a first metadata and a second metadata associated to the one or more pallets and the plurality of SKUs respectively;

a program code for notifying a first operator via an Augmented Reality (AR) enabled device, belongs to the first operator, for storing the plurality of SKUs in the one or more pallets;

a program code for updating an address of each pallet, storing the plurality of SKUs, in a Warehouse Management System (WMS) database upon receiving a signal from the first operator via the AR enabled device, wherein the signal indicates occupancy of the plurality of SKUs in the one or more pallets;

a program code for providing a pickup list comprising one or more SKUs, to be retrieve, stored in the one or more pallets;

a program code for determining
  at least one pallet, of the one or more pallets, storing the one or more SKUs, wherein the at least one pallet is determined based on the address stored in the WMS database, and
  a second operator, amongst a plurality of second operators, closest to the at least one pallet; and a program code for guiding the second operator, via a virtual map being displayed on the AR enabled device, to the address of the at least one pallet in order to retrieve the one or more SKUs thereby optimizing storage and retrieval of the SKU present in the warehouse.

* * * * *